(12) United States Patent
Huang et al.

(10) Patent No.: US 11,852,277 B2
(45) Date of Patent: Dec. 26, 2023

(54) SUPPORTING DEVICE

(71) Applicant: SYNCMOLD ENTERPRISE CORP., New Taipei (TW)

(72) Inventors: Chun-Hao Huang, New Taipei (TW); Chien-Wei Cheng, New Taipei (TW); Yaw-Lin Chen, New Taipei (TW); Po-Chun Chiu, New Taipei (TW); Chien-Cheng Yeh, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 17/585,633

(22) Filed: Jan. 27, 2022

(65) Prior Publication Data
US 2022/0381392 A1 Dec. 1, 2022

Related U.S. Application Data

(60) Provisional application No. 63/193,786, filed on May 27, 2021.

(30) Foreign Application Priority Data

Dec. 9, 2021 (TW) ................................. 110214679

(51) Int. Cl.
*F16M 11/10* (2006.01)
*F16M 11/04* (2006.01)

(52) U.S. Cl.
CPC ........... *F16M 11/046* (2013.01); *F16M 11/10* (2013.01); *F16M 2200/047* (2013.01)

(58) Field of Classification Search
CPC .............. F16M 11/046; F16M 11/10; F16M 2200/047; F16M 2200/048; F16M 11/24; Y10S 248/92; Y10S 248/919; Y10S 248/917; E05D 13/1207
USPC ........... 248/920, 364; 16/194, 196, 197, 198
See application file for complete search history.

(56) References Cited

U.S. PATENT DOCUMENTS

| | | | | |
|---|---|---|---|---|
| 4,760,622 A * | 8/1988 | Rohrman | ............ | E05D 13/1207 49/446 |
| 7,637,463 B2 * | 12/2009 | Yen | ........................ | F16M 11/24 248/370 |
| 2008/0099637 A1 * | 5/2008 | Pai | ........................ | F16M 11/30 248/157 |
| 2008/0210841 A1 * | 9/2008 | Tseng | ................... | F16M 11/046 361/679.06 |
| 2019/0226630 A1 * | 7/2019 | Chen | ................. | F16M 11/2014 |

\* cited by examiner

*Primary Examiner* — Terrell L McKinnon
*Assistant Examiner* — Jerry Nmn Olivier
(74) *Attorney, Agent, or Firm* — AMIN, TUROCY & WATSON, LLP

(57) ABSTRACT

A supporting device is provided and includes: a base; an upright column disposed on the base; a lifting module disposed on the upright column; a constant force arm unit including: a first rotating member rotatably disposed on the upright column and defining a constant first effective force arm; and a first wire wound on the first rotating member; a variable force arm unit including: a second rotating member linked with the first rotating member and defining a variable second effective force arm; and a second wire wound on the second rotating member; and an elastic force module connected to the first wire; where the torques respectively generated in the first wire and the second wire are balanced with each other.

14 Claims, 12 Drawing Sheets

SUPPORTING DEVICE

CROSS-REFERENCE TO RELATED APPLICATIONS

This application claims the benefit of U.S. Provisional Application Ser. No. 63/193,786 filed on May 27, 2021, and the benefit of Taiwan Patent Application Ser. No. 110214679 filed on Dec. 9, 2021. The entirety of each Application is incorporated herein by reference.

BACKGROUND

1. Technical Field

The present disclosure relates to a supporting device, and more particularly, to a supporting device with a variable effective force arm.

2. Description of Related Art

The Taiwan Patent No. 1391596 discloses a lifting device, including a base body, a sliding component, a lifting supporting base, a gear set, a linkage member and a spring member, wherein the linkage member is connected to the lifting supporting base and the gear set. The gear set includes a first gear connected to the lifting supporting base, a second gear meshing with the first gear, a third gear disposed on the second gear and coaxially rotating with the second gear, a fourth gear meshing with the third gear, and a pivot disposed on the fourth gear and provided for the spring member to connect thereto, wherein when the lifting supporting base slides relative to the base body by the sliding component, the spring member is elongated or shortened, and at the same time the gear set is linked, and the fourth gear rotates to make the pivot move closer to or away from the third gear, resulting in a corresponding change in the effective force arm to produce a corresponding change in torque.

The present disclosure provides another supporting device of variable effective force arm. A variable force arm unit is disposed between a lifting supporting base and a linkage member to achieve the effect of the variable effective force arm.

SUMMARY

The present disclosure provides a supporting device for carrying a display on a work surface, the supporting device comprises: a base disposed on the work surface; an upright column disposed on the base, extending substantially along a gravity direction and including an opening; a lifting module disposed on the upright column and including: a sliding carrier sliding upward or downward between a lowest position and a highest position along the gravity direction, and partially extending outward along a first axis from the opening for the display to be arranged; a constant force arm unit including: a first rotating member self-rotatably disposed on the upright column and defining a constant first effective force arm; and a first wire being wound on the first rotating member and having a first head end and a first tail end opposite to each other, wherein the first head end is connected to the first rotating member, and wherein a proportion of the first wire wound around the first rotating member gradually decreases when the sliding carrier is moved from the lowest position to the highest position; a variable force arm unit including: a second rotating member linked with the first rotating member and defining a variable second effective force arm; and a second wire being wound on the second rotating member and having a second head end and a second tail end opposite to each other, wherein the second head end is connected to the second rotating member, and the second tail end is connected to the sliding carrier, and wherein a proportion of the second wire wound around the second rotating member gradually increases when the sliding carrier is moved from the lowest position to the highest position; and an elastic force module including: an elastic member having a first end and a second end opposite to each other, wherein the first end is connected to the first tail end of the first wire, and the elastic member constantly provides an elastic force, wherein when the sliding carrier is at the lowest position, the elastic force is largest, and when the sliding carrier is at the highest position, the elastic force is smallest; wherein the sliding carrier and the display are able to be actuated between the lowest position and the highest position when an external force is applied, and wherein when the external force is removed, a first torque generated in the first wire and a second torque generated in the second wire are balanced each other, such that the sliding carrier and the display are stopped at an arbitrary position between the lowest position and the highest position.

In the aforementioned supporting device, when the sliding carrier moves from the lowest position to the highest position, the elastic force gradually decreases, the proportion of the first wire wound around the first rotating member gradually decreases, and the first effective force arm remains unchanged, such that the first torque gradually decreases, and the proportion of the second wire wound around the second rotating member gradually increases, and the second effective force arm gradually becomes shorter, such that the second torque gradually decreases, and the first torque and the second torque gradually decrease substantially synchronously.

In the aforementioned supporting device, when the sliding carrier moves from the highest position to the lowest position, the elastic force gradually increases, the proportion of the first wire wound around the first rotating member gradually increases, and the first effective force arm remains unchanged, such that the first torque gradually increases, and the proportion of the second wire wound around the second rotating member gradually decreases, and the second effective force arm gradually becomes longer, such that the second torque gradually increases, and the first torque and the second torque gradually increase substantially synchronously.

In the aforementioned supporting device, the first rotating member has a shaft with a constant diameter, and the shaft rotates along a main axis, and wherein the second rotating member further has a gyro body and a spiral groove, the gyro body rotates along a central axis, the spiral groove is formed on an outer surface of the gyro body and is arranged to be wound by the second wire.

In the aforementioned supporting device, the spiral groove has a groove head and a groove tail, a distance from the groove head to the central axis is largest, a distance from the groove tail to the central axis is smallest, and the second head end of the second wire is fixed to the groove head.

In the aforementioned supporting device, the elastic force module further includes an adjustment unit, and the second end of the elastic member is connected to the adjustment unit, and wherein a pre-stretching degree of the elastic member is able to be changed by operating the adjustment unit.

In the aforementioned supporting device, the adjustment unit has an adjusting member and a fixing member, the fixing member is disposed on the upright column, the adjusting member is screwed on the fixing member and partially protrudes outside the upright column.

In the aforementioned supporting device, the adjusting member has a screw rod and a turntable fixedly connected to the screw rod, wherein the fixing member has a body, an internal threaded portion, an external threaded portion and a straight portion, wherein the internal threaded portion is screwed on the screw rod, the straight portion abuts against the upright column, the external threaded portion is screwed to the elastic member, and wherein when the turntable is rotated, the body is moved relative to the screw rod by a limiting of the straight portion to adjust a stretching degree of the elastic member.

In the aforementioned supporting device, the upright column further includes a housing, the housing has a through slot, and the turntable partially protrudes from the through slot.

In the aforementioned supporting device, the lifting module further includes two sliding rails, the sliding rails are disposed on the upright column, and the sliding carrier is sandwiched between the sliding rails.

In the aforementioned supporting device, the gyro body is fixedly connected to the shaft, and wherein the gyro body and the shaft synchronously rotate in a same direction.

In the aforementioned supporting device, the central axis coincides with the main axis and is substantially perpendicular to the first axis, and wherein the groove head is adjacent to the shaft.

In the aforementioned supporting device, a direction in which the first wire is wound around the shaft is opposite to a direction in which the second wire is wound around the spiral groove.

In the aforementioned supporting device, the first rotating member further has a first gear fixed to the shaft, the second rotating member further has a second gear fixed to the gyro body, and wherein the first gear and the second gear are meshed with each other, such that the gyro body and the shaft rotate synchronously but in opposite directions.

In the aforementioned supporting device, a direction in which the first wire is wound around the shaft is same as a direction in which the second wire is wound around the spiral groove.

In the aforementioned supporting device, the central axis is parallel to the main axis and parallel to the first axis, and wherein the gyro body and the shaft are stacked up and down.

In the aforementioned supporting device, a number of teeth of the first gear is different from a number of teeth of the second gear.

DETAILED DESCRIPTIONS

Figure 1:
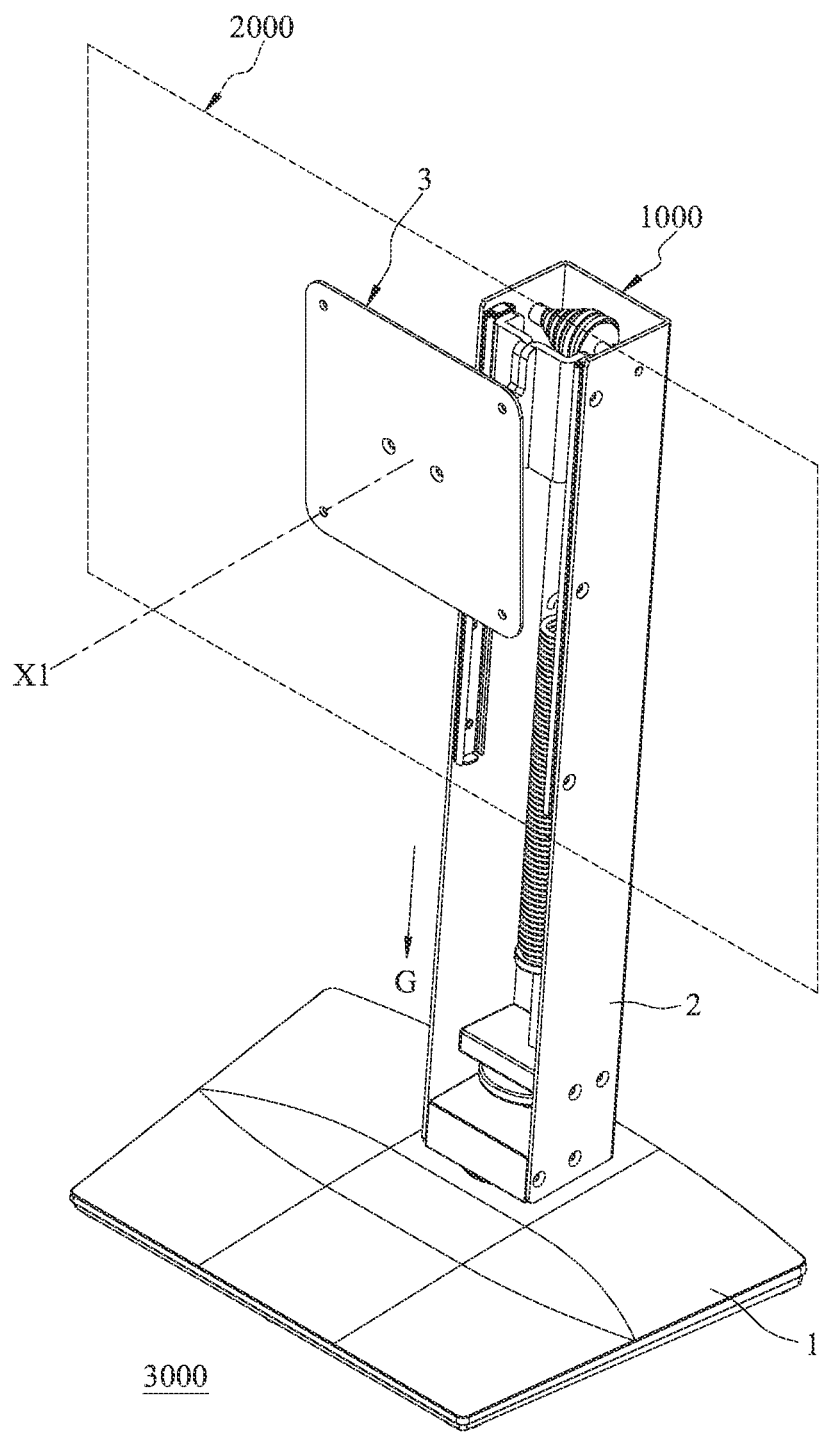
FIG. 1 is a schematic overall view of a supporting device according to a first embodiment of the present disclosure.
Figure 2:
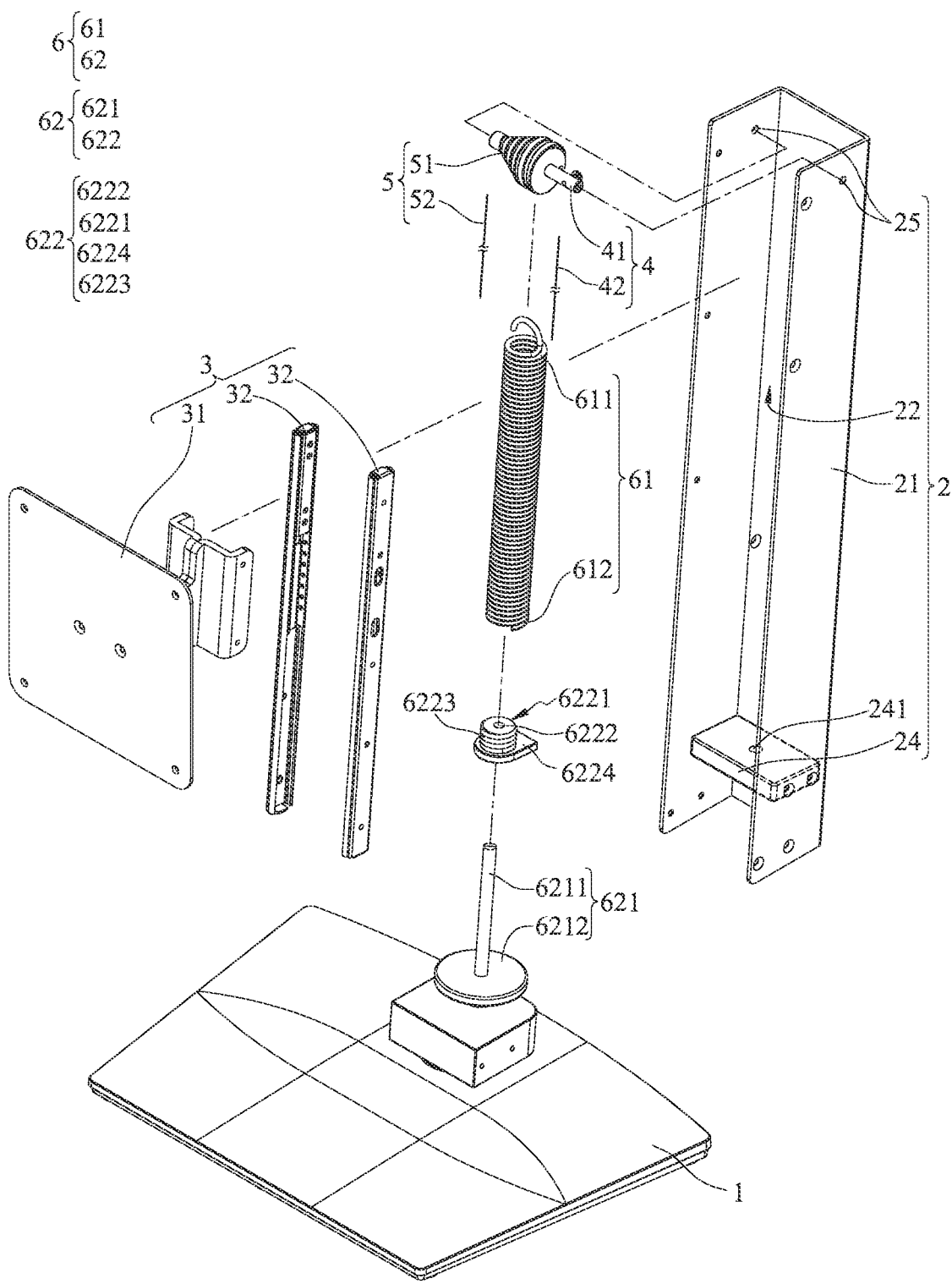
FIG. 2 is a schematic exploded view of the supporting device according to the first embodiment of the present disclosure.

Please refer to FIG. 1 and FIG. 2. In a first embodiment according to the present disclosure, a supporting device 1000 is used for carrying a display 2000 on a work surface 3000 (for example, a desktop, a wall, etc.). The supporting device 1000 includes a base 1, an upright column 2, a lifting module 3, a constant force arm unit 4, a variable force arm unit 5 and an elastic force module 6, wherein the base 1 is disposed on the work surface 3000, the upright column 2 extends substantially along a gravity direction G and is disposed on the base 1, the lifting module 3 is disposed on the upright column 2 and used for carrying the display 2000, the constant force arm unit 4 is disposed on the upright column 2, the variable force arm unit 5 is disposed on the upright column 2 and linked with the lifting module 3 and the constant force arm unit 4, and the elastic force module 6 is disposed on the upright column 2 and linked with the constant force arm unit 4. The structure of each element and the connection relationship between each element will be described in detail below, where part of the drawings shows the gravity direction G.

The base 1 is roughly a trapezoidal plate, so that the base 1 can be firmly placed directly on the work surface 3000, but it is not limited to this. For example, the base 1 can also be fixed (on a wall) by screws (not shown in the figures) or clamped (on a desktop).

Figure 3:
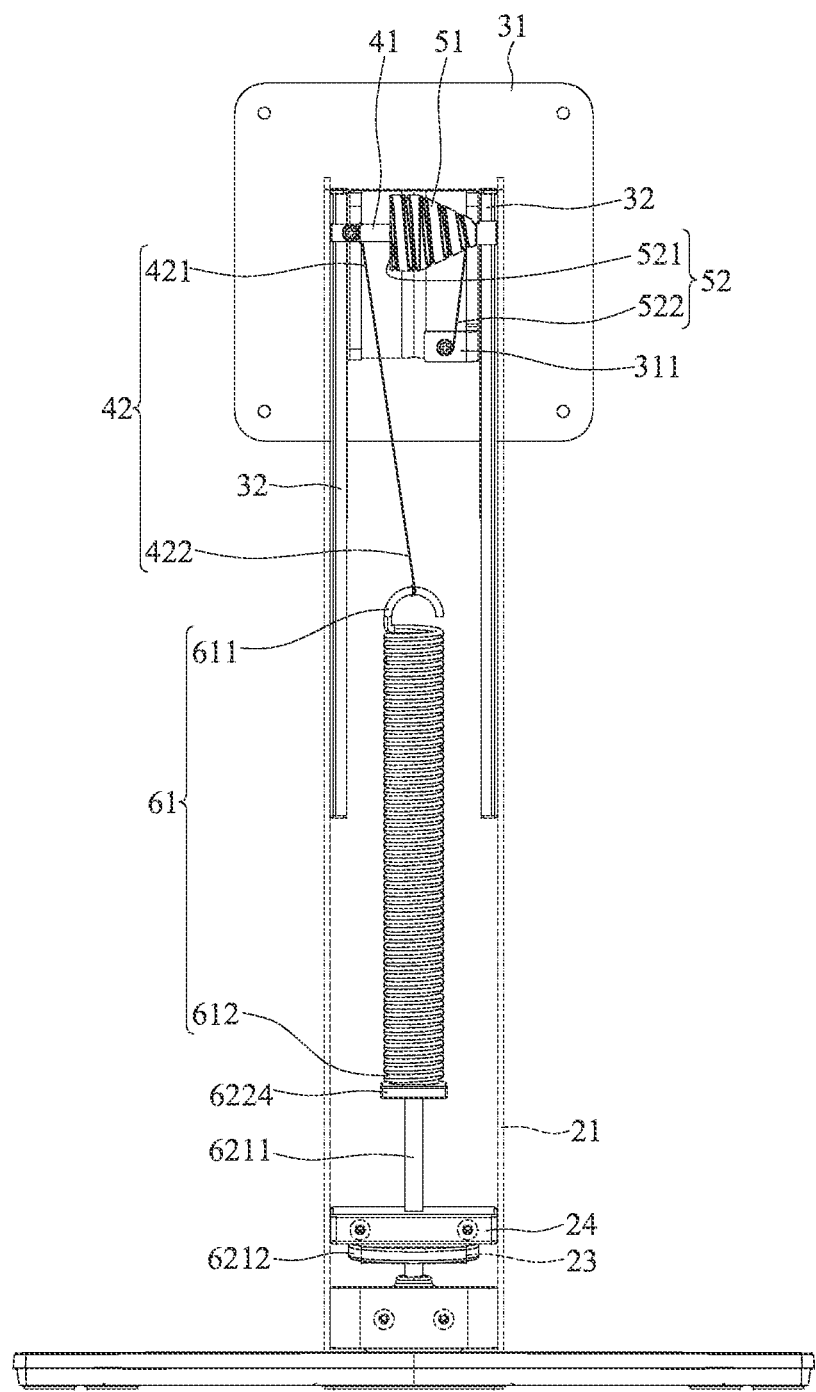
FIG. 3 is a schematic rear view of the supporting device according to the first embodiment of the present disclosure.

Please refer to FIG. 3 together, the upright column 2 is roughly a hollow column, is connected to the base 1, and includes a housing 21 (part of the housing is omitted for the convenience of description), an opening 22, a through slot 23, a fixing block 24 and two through holes 25 (for the convenience of description, the housing 21 is shown in dashed lines in FIG. 3). The housing 21 extends from and fixes to the base 1 in a manner of slightly inclined the work surface 3000, and roughly has a U-shaped cross-section. In other embodiments, the housing 21 can also extend perpendicular to the work surface 3000, which is not limited here. The opening 22 is formed on the housing 21 and extends substantially along the gravity direction G. The through slot 23 is formed on the back of the housing 21 and adjacent to the base 1 and extends in a direction perpendicular to the gravity direction G. The fixing block 24 is disposed in the housing 21. The fixing block 24 can be fixed to the housing 21 by screws (not shown in the figures), is located above the through slot 23, and has a penetrating hole 241 that penetrates substantially along the gravity direction G. The through holes 25 are respectively formed on two opposite sides of the housing 21.

The lifting module 3 includes a sliding carrier 31 and two sliding rails 32. The sliding carrier 31 partially extends outwards along a first axis X1 from the opening 22 for the display 2000 to be disposed, and has a fixing wire portion 311. The fixing wire portion 311 is located in the housing 21 and is specifically a square plate with a screw fixed on it. The sliding rails 32 are three-section sliding rails respectively disposed on two opposite sides of the housing 21 (in the housing 21) and adjacent to the opening 22, such that the sliding carrier 31 is sandwiched therebetween, thereby allowing the sliding carrier 31 to slide upward or downward between a lowest position and a highest position along the gravity direction G. In other embodiments, the sliding rails 32 may also be two-section sliding rails or other types of sliding rails, and the present disclosure is not limited to this.

Figure 4:
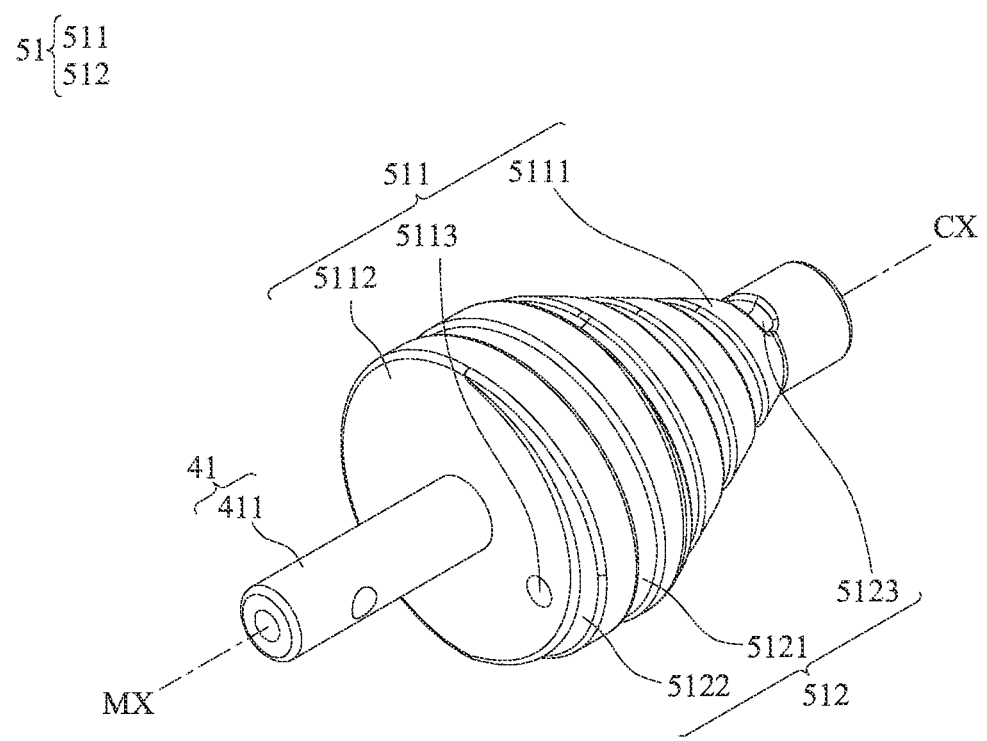
FIG. 4 is a schematic enlarged view of a first rotating member and a second rotating member of the supporting device according to the first embodiment of the present disclosure.

Please also refer to FIG. 4, the constant force arm unit 4 includes a first rotating member 41 and a first wire 42. The first rotating member 41 can be self-rotatably disposed in the housing 21 of the upright column 2 and has a shaft 411. The shaft 411 is an equal-diameter cylinder, further defines a constant first effective force arm, one end of which is pivotally connected to one of the through holes 25, and can rotate by itself along a main axis MX. The first wire 42 has a first head end 421 and a first tail end 422 opposite to each other. In order to facilitate show and avoid concealing other elements, the first wire 42 is simplified into a single line in the drawings. The first head end 421 is connected to the shaft 411, for example, by a screw fixed to the shaft 411, and can be wound on the shaft 411 when the shaft 411 rotates. The first tail end 422 is connected to the elastic force module 6.

The variable force arm unit 5 includes a second rotating member 51 and a second wire 52. The second rotating member 51 is linked with the first rotating member 41 and defines a variable second effective force arm. In detail, the second rotating member 51 has a gyro body 511 and a spiral groove 512. The gyro body 511 has a conical structure, can rotate by itself along a central axis CX, and has a tip 5111, a bottom 5112 opposite to the tip 5111, and a screw hole 5113. The tip 5111 is pivotally connected to the other one of the through holes 25. The bottom 5112 has a diameter greater than a diameter of the tip 5111, is fixed to the shaft 411, and can be linked with the shaft 411. The screw hole 5113 is formed at the bottom 5112. The spiral groove 512 is formed on an outer surface of the gyro body 511 and has a groove body 5121, a groove head 5122 and a groove tail 5123. The groove body 5121 is recessed on the outer surface of the gyro body 511 in a spiral manner. For example, when viewed from the bottom 5112 to the tip 5111, the groove body 5121 is spirally recessed from the bottom 5112 to the tip 5111 in a clockwise direction. The groove head 5122 is disposed at one end of the groove body 5121 and at the bottom 5112, and is adjacent to the shaft 411, such that a vertical distance from the groove head 5122 to the central axis CX is the largest. The groove tail 5123 is disposed at the other end of the groove body 5121 and at the tip 5111, such that a vertical distance from the groove tail 5123 to the central axis CX is the smallest. The vertical distance from each point in the groove body 5121 to the central axis CX gradually decreases from the groove head 5122 to the groove tail 5123, so the second effective force arm will change with different positions of the spiral groove 512. For example, the second effective force arm adjacent to the groove head 5122 is longer than the second effective force arm adjacent to the groove tail 5123. In the embodiment, the central axis CX substantially coincides with the main axis MX and is substantially perpendicular to the first axis X1, so the gyro body 511 and the shaft 411 rotate synchronously and in the same direction.

The second wire 52 is wound around the spiral groove 512, and has a second head end 521 and a second tail end 522 opposite to each other. In order to facilitate show and avoid concealing other elements, the second wire 52 is also simplified into a single line in the drawings. The second head end 521 is fixed to the groove head 5122, and can be fixed to the screw hole 5113 by, for example, a screw. The second tail end 522 is fixed to the screw of the fixing wire portion 311 of the sliding carrier 31. Therefore, the second wire 52 is wound in the direction of the spiral groove 512, for example, when viewed from the bottom 5112 to the tip 5111, the second wire 52 is wound in a clockwise direction from the groove head 5122 to the groove tail 5123.

The elastic force module 6 includes an elastic member 61 and an adjustment unit 62. The elastic member 61 is a tension spring, which constantly provides an elastic force, and has a first end 611 and a second end 612 opposite to each other. The first end 611 is connected to the first tail end 422 of the first wire 42, and the second end 612 is connected to the adjustment unit 62. The adjustment unit 62 is used for changing a pre-stretching degree of the elastic member 61 and has an adjusting member 621 and a fixing member 622. The adjusting member 621 has a screw rod 6211 and a turntable 6212. The screw rod 6211 penetrates through the penetrating hole 241 and passes through the fixing block 24. The turntable 6212 is fixed to one end of the screw rod 6211 and is adjacent to the base 1 and located below the fixing block 24. The turntable 6212 partially protrudes from the through slot 23 so as to be operated. The fixing member 622 has a body 6221, an internal threaded portion 6222, an external threaded portion 6223, and a straight portion 6224. The body 6221 is roughly cylindrical. The internal threaded portion 6222 penetrates through the body 6221 along the gravity direction G, and is provided for the screw rod 6211 to screw. The external threaded portion 6223 is formed on an outer peripheral surface of the body 6221 and screws the second end 612 of the elastic member 61. The straight portion 6224 is roughly in the shape of a plate, is formed on a bottom surface of the body 6221, and abuts against a back surface of the housing 21 of the upright column 2. When the turntable 6212 is rotated, the screw rod 6211 is linked to rotate relatively spirally in the internal threaded portion 6222, and the body 6221 cannot rotate synchronously but moves up and down relative to the screw rod 6211 due to the limit of the straight portion 6224, thereby adjusting the pre-stretching degree of the elastic member 61. For example, when the body 6221 moves upward relative to the screw rod 6211, the pre-stretching degree of the elastic member 61 is reduced. When the body 6221 moves downward relative to the screw rod 6211, the pre-stretching degree of the elastic member 61 increases, and an initial value of the elastic force will be larger.

Figure 5A:
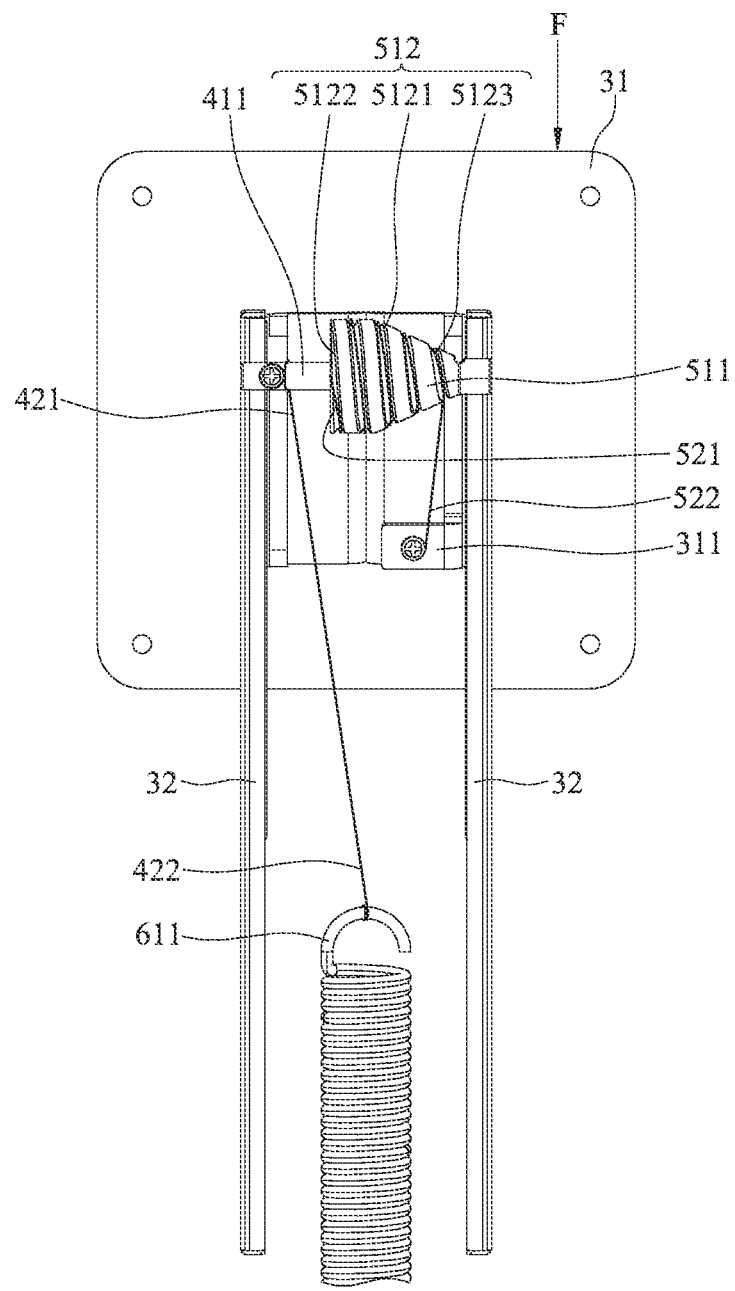
FIGS. 5A and 5B are schematic views of an operation of the supporting device according to the first embodiment of the present disclosure.
Figure 5B:
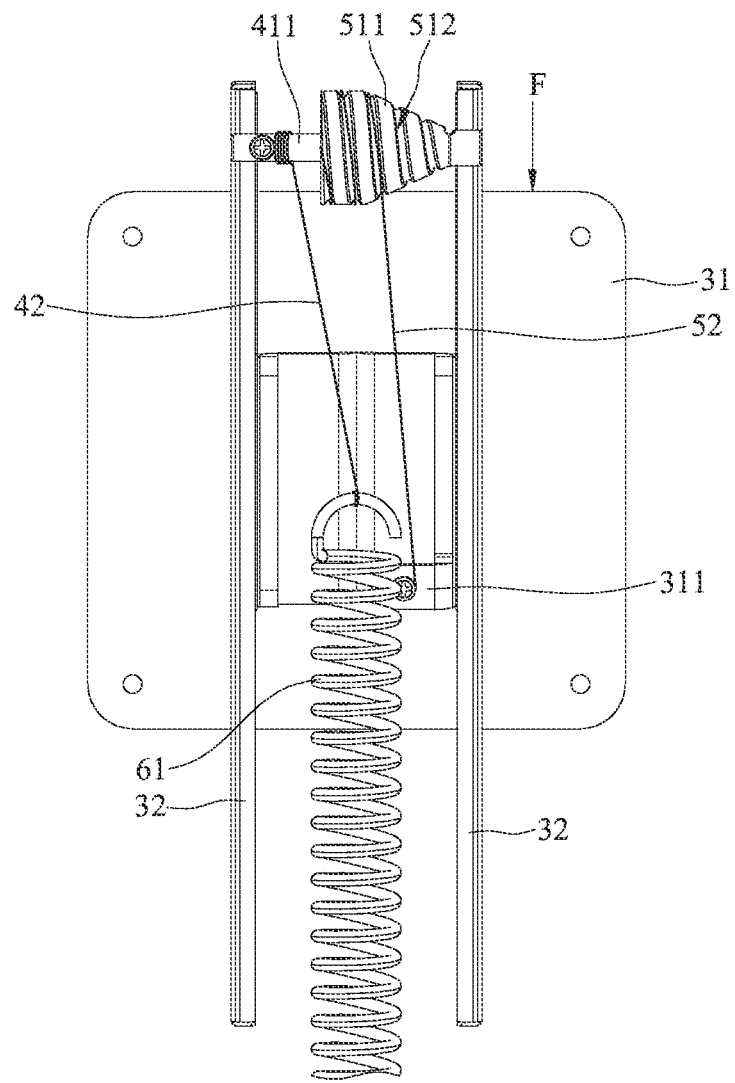

Please refer to FIG. 5A (for the convenience of description, FIG. 5A does not show related elements of the upright column 2), when the sliding carrier 31 is at the highest position, the first head end 421 of the first wire 42 is wound in a counterclockwise direction (viewed in the direction from the bottom 5112 to the tip 5111) one turn on the shaft 411, and the second head end 521 of the second wire 52 is wound from the groove head 5122 through the groove body 5121 to the groove tail 5123. When an external force F is applied to move the sliding carrier 31 from the highest position (FIG. 5A) to the lowest position (FIG. 5B), as shown in FIG. 5B (for convenience of explanation, FIG. 5B does not show the related elements of the upright column 2), the second wire 52 gradually separates from the spiral groove 512, thereby reducing the proportion of being wound in the spiral groove 512, and driving the gyro body 511 to rotate. Since the gyro body 511 and the shaft 411 rotate synchronously and in the same direction, the proportion of the first wire 42 being wound on the shaft 411 in a counterclockwise direction gradually increases (for example, from being wound one turn to being wound five turns), thereby driving the elastic member 61 to stretch. At the lowest position, the elastic force provided by the elastic member 61 is the largest according to the maximum stretch by the first wire 42. On the contrary, at the highest position, the elastic force provided by the elastic member 61 is the smallest according to the smallest degree of stretch by the first wire 42. Therefore, when the sliding carrier 31 actuates from the highest position to the lowest position, the elastic force gradually becomes larger. Since the first effective force arm remains unchanged, a first torque will gradually become larger; and at the same time as the foregoing process, the second wire 52 starts to separate from the groove tail 5123, causing the proportion of being wound around the spiral groove 512 to gradually decrease, so that the second effective force arm gradually becomes longer, so a second torque also gradually becomes larger. Since the constant force arm unit 4 and the variable force arm unit 5 are linked, the first torque and the second torque become substantially synchronous and gradually increase. When the external force F is removed, the first torque of the first wire 42 generated by the elastic force and the second torque of the second wire 52 generated by the weight of the display 2000 can be balanced with each other, so that the sliding carrier 31 and the display 2000 can stop at an arbitrary position between the lowest position and the highest position.

Similarly, when an external force F is applied to make the sliding carrier 31 actuate from the lowest position to the highest position, for example, from FIG. 5B to FIG. 5A, at this time, the elastic force of the elastic member 61 pulls the first wire 42 and drives the gyro body 511 to rotate, so that the proportion of the first wire 42 being wound on the shaft 411 gradually decreases (for example, from being wound five turns to being wound one turn). Since the gyro body 511 and the shaft 411 rotate synchronously and in the same direction, the second wire 52 is gradually wound back to the spiral groove 512 until the groove tail 5123, thereby increasing the proportion of winding in the spiral groove 512. Because the degree of stretching is gradually reduced, the elastic force of the elastic member 61 gradually becomes smaller, and because the first effective force arm is unchanged, the first torque will gradually become smaller; and at the same time as the foregoing process, the second wire 52 is gradually wound back to the spiral groove 512, causing the proportion of winding around the spiral groove 512 to gradually increase, so that the second effective force arm gradually becomes shorter, so the second torque gradually becomes smaller. Since the constant force arm unit 4 and the variable force arm unit 5 are linked, the first torque and the second torque are gradually decreased substantially synchronously.

In the above embodiment, the spiral groove 512 is spirally recessed on the outer surface of the gyro body 511 in a clockwise direction (viewed in the direction from the bottom 5112 to the tip 5111), and the second wire 52 is also wound in a clockwise direction from the groove head 5122 to the groove tail 5123 (viewed in the direction from the bottom 5112 to the tip 5111), but the present disclosure is not limited to this. The spiral groove 512 can also be spirally recessed on the outer surface of the gyro body 511 in a counterclockwise direction (viewed in the direction from the bottom 5112 to the tip 5111), the second wire 52 is also wound in a counterclockwise direction from the groove head 5122 to the groove tail 5123 (viewed in the direction from the bottom 5112 to the tip 5111). Regardless of whether it is clockwise or counterclockwise direction, because the gyro body 511 and the shaft 411 rotate in the same direction synchronously, the winding direction of the second wire 52 from the groove head 5122 to the groove tail 5123 is opposite to the direction in which the first wire 42 is wound on the shaft 411. In addition, a number of turns of the spiral groove 512 recessed on the outer surface of the gyro body 511 and a number of turns of the first wire 41 wound on the shaft 411 can also have different designs according to requirements, and the present disclosure is not limited thereto. In addition, the above-mentioned embodiment employs FIG. 5B as the lowest position (the sliding carrier 31 slides to the middle of each of the sliding rails 32), but it is not limited to this. In other embodiments, the lowest position referred to in the present disclosure can further slide the sliding carrier 31 to the bottom of each of the sliding rails 32, so that the proportion of the second wire 52 wound around the spiral groove 512 is reduced to only the groove head 5122, and the proportion of winding the first wire 42 on the shaft 411 is increased to more than five turns.

Figure 6:
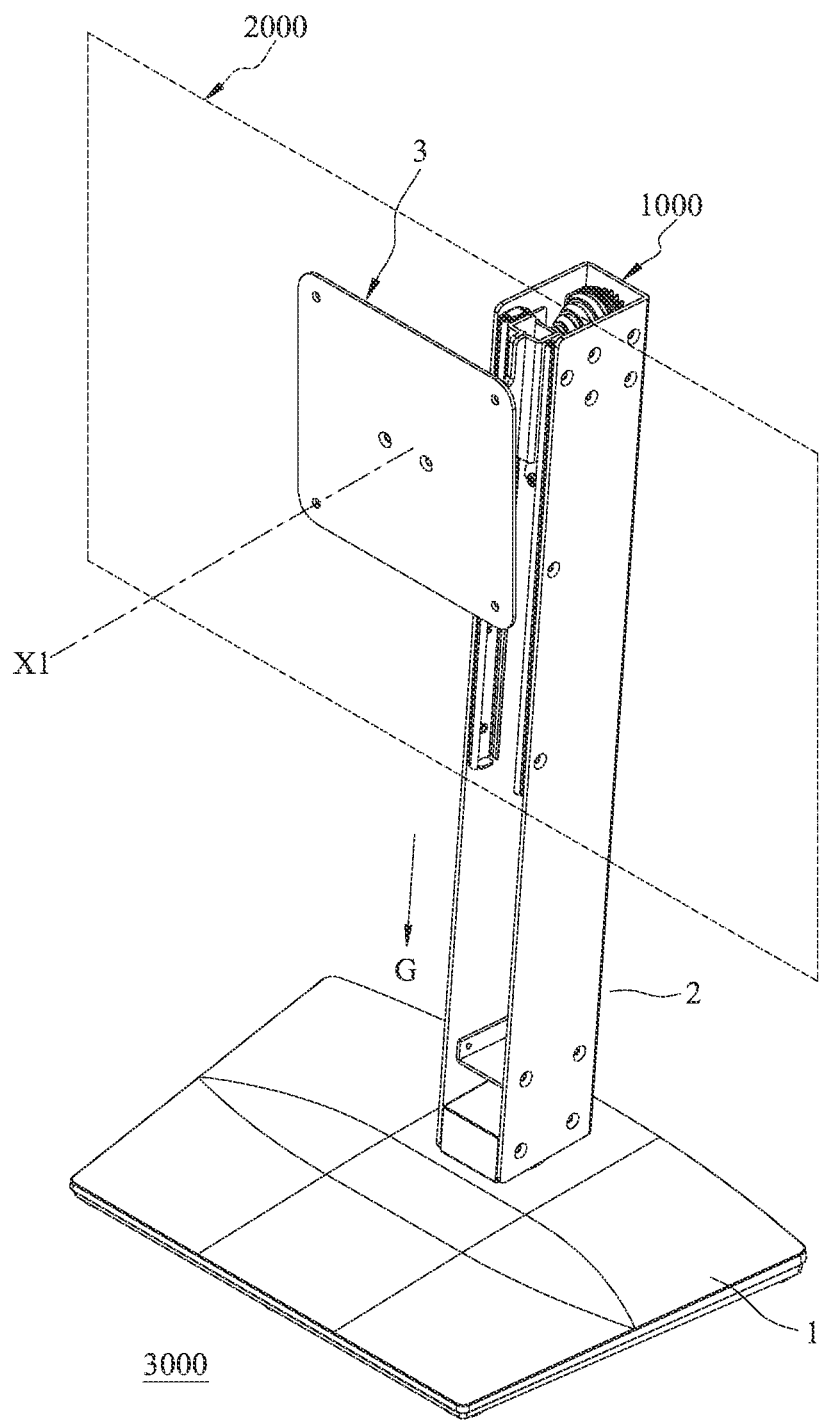
FIG. 6 is a schematic overall view of the supporting device according to a second embodiment of the present disclosure.
Figure 7:
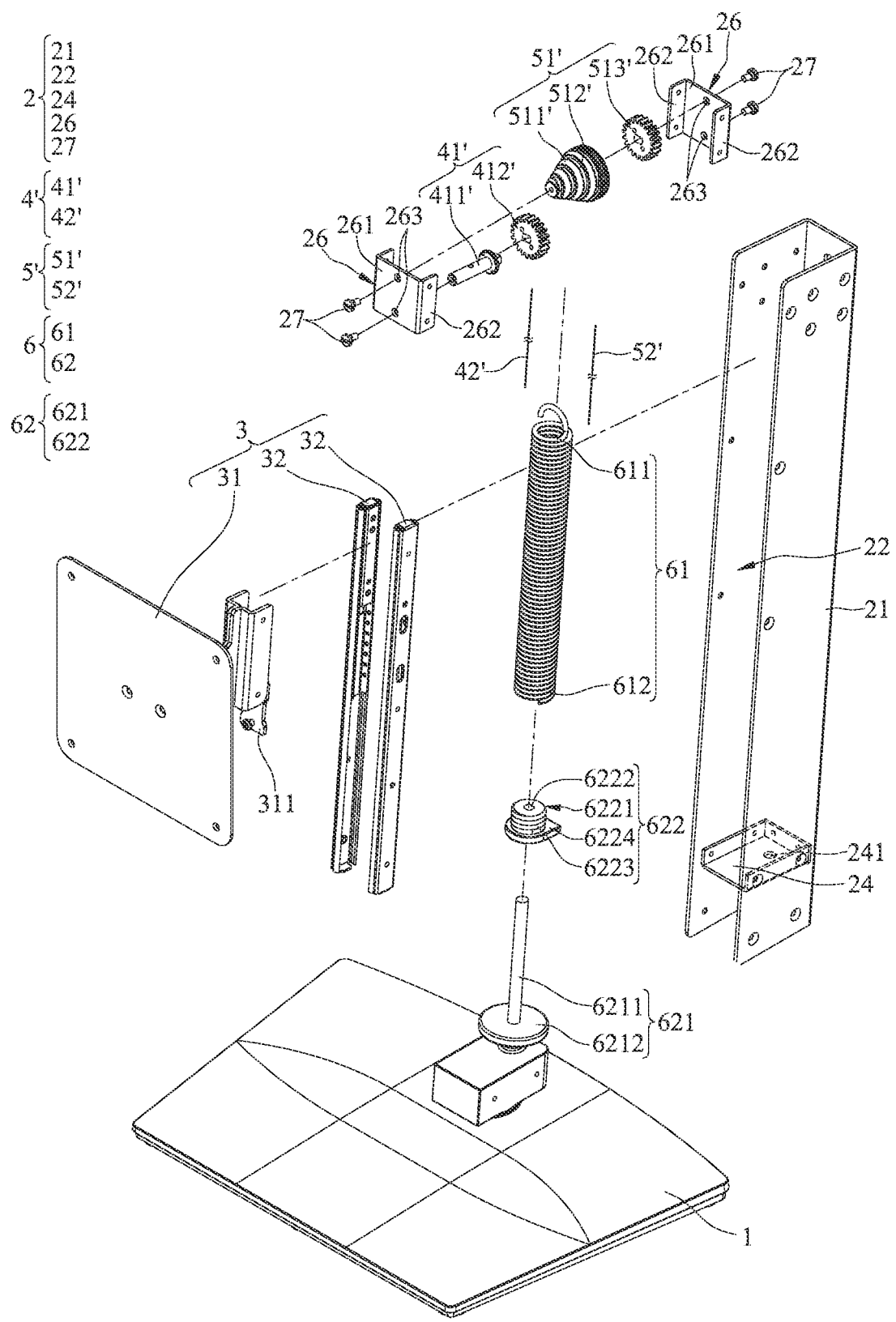
FIGS. 7 and 8 are schematic exploded views of the supporting device in different viewing angles according to the second embodiment of the present disclosure.
Figure 8:
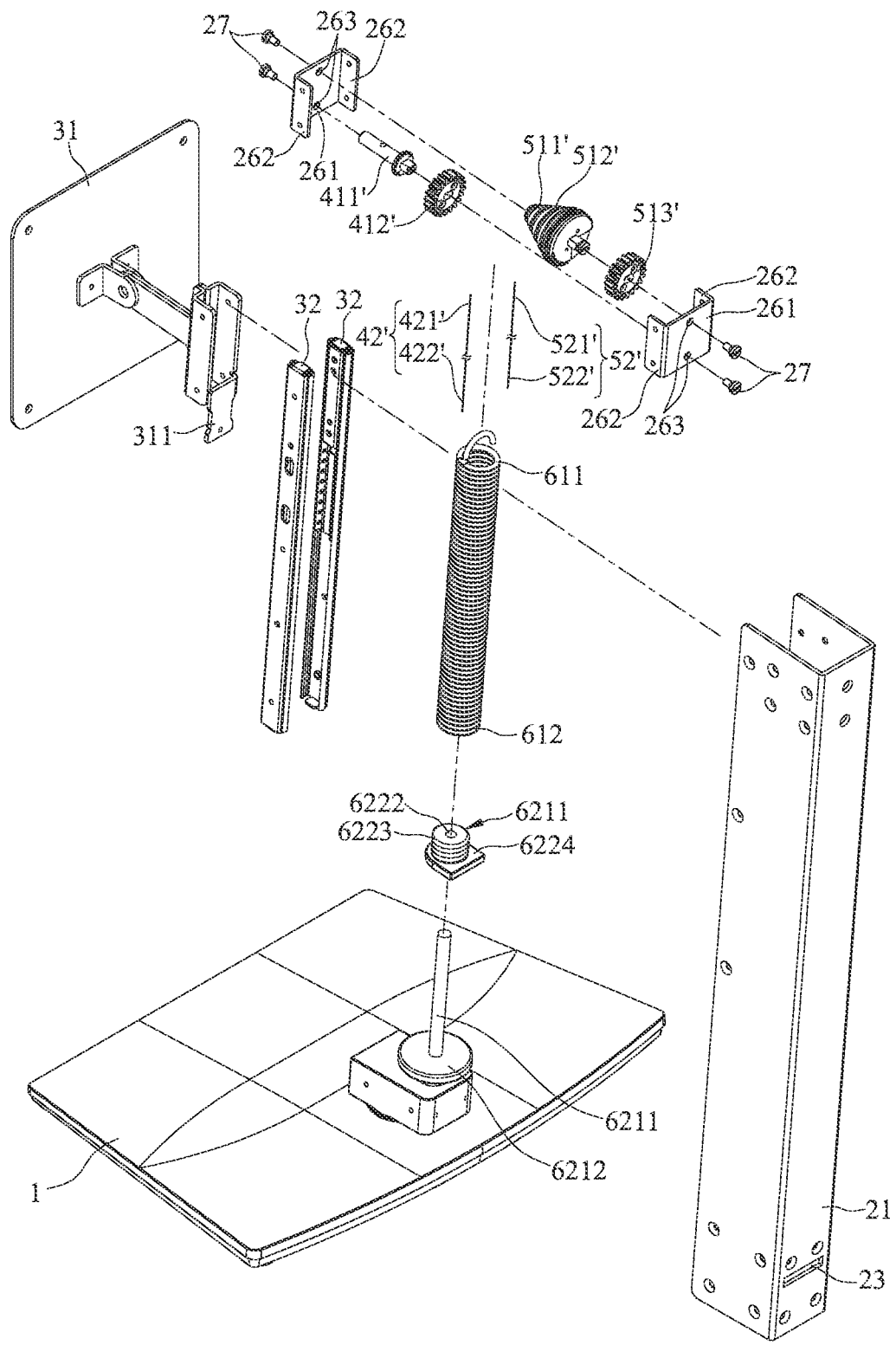

Next, referring to FIG. 6, FIG. 7 and FIG. 8, in a second embodiment according to the present disclosure, a supporting device 1000 is used for carrying a display 2000 on a work surface 3000 (such as a desktop, a wall, etc.). The supporting device 1000 includes a base 1, an upright column 2, a lifting module 3, a constant force arm unit 4', a variable force arm unit 5' and an elastic force module 6, wherein the base 1 is disposed on the work surface 3000, the upright column 2 substantially extends along a gravity direction G and is disposed on the base 1, the lifting module 3 is disposed on the upright column 2 and used for carrying the display 2000, the constant force arm unit 4' is disposed on the upright column 2, the variable arm unit 5' is disposed on the upright column 2 and linked with the lifting module 3 and the constant force arm unit 4', and the elastic force module 6 is disposed on the upright column 2 and linked with the constant force arm unit 4'. The main difference between the second embodiment and the first embodiment is that a first rotating member 41' and a second rotating member 51' are no longer coaxially disposed on the left and right sides; instead, the first rotating member 41' and the second rotating member 51' are being biaxially stacked up and down, and the direction of self-rotation is opposite. The structure of each element and the connection relationship between each element will be described in detail below, where part of the drawings shows the gravity direction G.

The base 1 is roughly a trapezoidal plate, so that the base 1 can be firmly placed directly on the work surface 3000, but it is not limited to this. For example, the base 1 can also be fixed (on a wall) by screws (not shown in the figures) or clamped (on a desktop).

The upright column 2 is roughly a hollow column, is connected to the base 1, and includes a housing 21 (part of the housing is omitted for the convenience of description), an opening 22, a through slot 23, a fixing block 24, two frame members 26 and four pivoting members 27. The housing 21 extends from and fixes to the base 1 in a manner of slightly inclined the work surface 3000, and roughly has a U-shaped cross-section. In other embodiments, the housing 21 can also extend perpendicular to the work surface 3000, which is not limited here. The opening 22 is formed on the housing 21 and extends substantially along the gravity direction G. The through slot 23 is formed on the back of the housing 21 and adjacent to the base 1 and extends in a direction perpendicular to the gravity direction G. The fixing block 24 is disposed in the housing 21. The fixing block 24 can be fixed to the housing 21 by screws (not shown in the figures), is located above the through slot 23, and has a penetrating hole 241 that penetrates substantially along the gravity direction G. Each of the frame members 26 is respectively disposed in the housing 21, and has a body 261, two side wings 262 and two pivoting holes 263. Each of the bodies 261 is roughly square, the side wings 262 are respectively formed by bending and extending from two opposite sides of the corresponding body 261, and the pivoting holes 263 are formed in the corresponding body 261 and arranged up and down along the gravity direction G. The frame members 26 are disposed in the housing 21 with their opening directions opposite to each other, and are fixed to the housing 21 by screws (not shown in the figures), for example. The pivoting members 27 respectively penetrates through the pivoting holes 263.

The lifting module 3 includes a sliding carrier 31 and two sliding rails 32. The sliding carrier 31 partially extends outwards along a first axis X1 from the opening 22 for the display 2000 to be disposed, and has a fixing wire portion 311. The fixing wire portion 311 is located in the housing 21 and is specifically a square plate with a screw fixed on it. The sliding rails 32 are three-section sliding rails respectively disposed on two opposite sides of the housing 21 (in the housing 21) and adjacent to the opening 22, such that the sliding carrier 31 is sandwiched therebetween, thereby allowing the sliding carrier 31 to and slide upward or downward between a lowest position and a highest position along the gravity direction G. In other embodiments, the sliding rails 32 may also be two-section sliding rails or other types of sliding rails, and the present disclosure is not limited to this.

Figure 9:
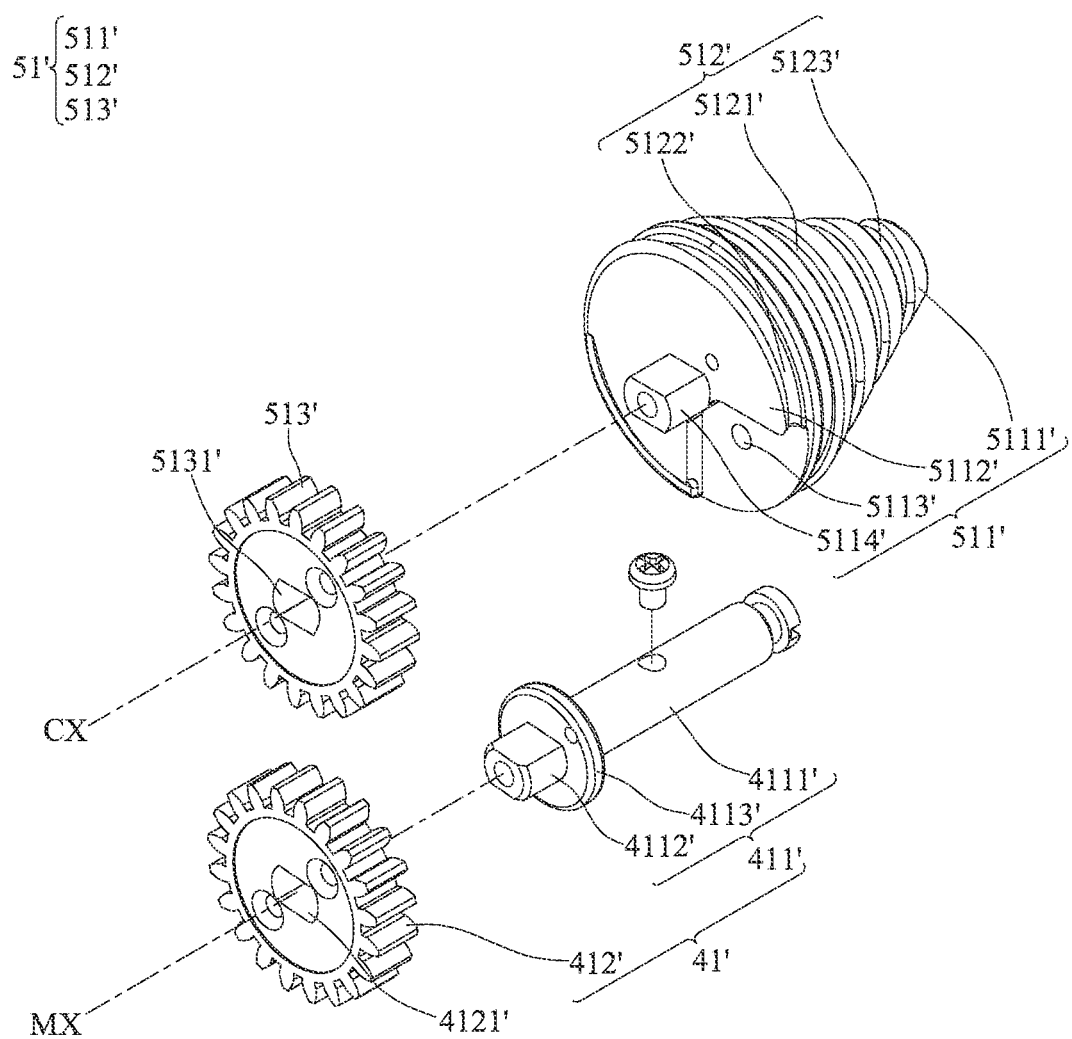
FIG. 9 is a schematic enlarged view of the first rotating member and the second rotating member of the supporting device according to the second embodiment of the present disclosure.
Figure 10A:
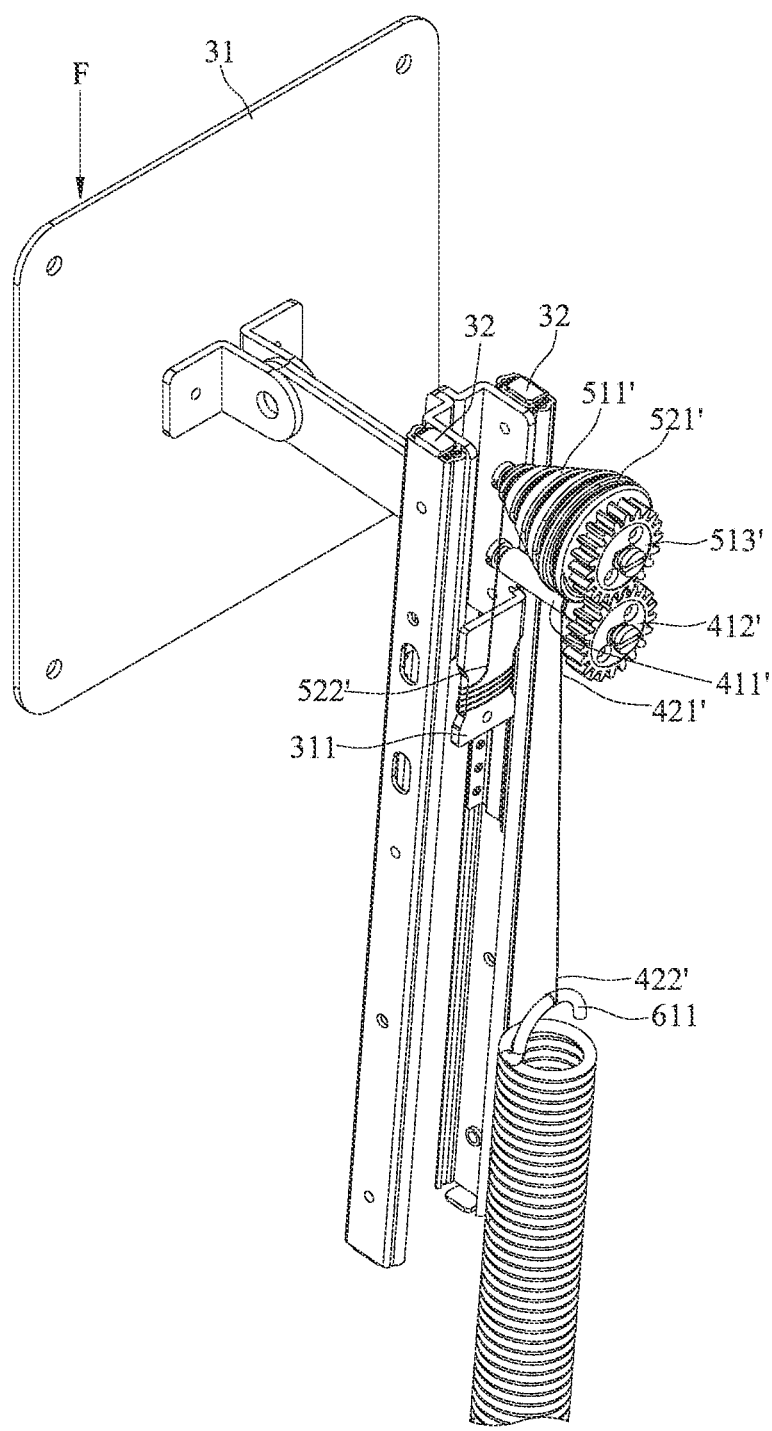
FIGS. 10A and 10B are schematic views of an operation of the supporting device according to the second embodiment of the present disclosure.

Please refer to FIGS. 9 and 10A together, a constant force arm unit 4' includes a first rotating member 41' and a first wire 42'. The first rotating member 41' can be self-rotatably disposed in the housing 21 of the upright column 2, and has a shaft 411' and a first gear 412'. The shaft 411' has a cylindrical section 4111', a fixing section 4112', and a limiting section 4113'. The cylindrical section 4111' is an equal-diameter cylinder, which can define a constant first effective force arm. One end of the cylindrical section 4111' is pivotally connected to one of the pivoting members 27 adjacent to the sliding carrier 31. A cross-sectional shape of the fixing section 4112' is non-circular (for example, a flat shape), and one end of the fixing section 4112' is pivotally connected to one of the pivoting members 27 away from the sliding carrier 31. The limiting section 4113' is fixedly connected to the cylindrical section 4111' and the fixing section 4112', and is located between the cylindrical section 4111' and the fixing section 4112'. Therefore, the shaft 411' is completely contained between the frame members 26 and can rotate by itself along a main axis MX. The first gear 412' is fixed to the fixing section 4112' of the shaft 411' and abuts against the limiting section 4113'. In specific, the first gear 412' has a first central hole 4121', the first central hole 4121' is for the fixing section 4112' to accommodate, and a cross-sectional shape of the first central hole 4121' is the same as the cross-sectional shape of the fixing section 4112' and is a flat shape, so the first gear 412' can move simultaneously with the shaft 411'. The first wire 42' has a first head end 421' and a first tail end 422' opposite to each other. In order to facilitate show and avoid concealing other elements, the first wire 42' is simplified into a single line in the drawings. The first head end 421' is connected to the cylindrical section 4111' of the shaft 411'. For example, the first head end 421' is fixed on a screw of the cylindrical section 4111', and can be wound around the cylindrical section 4111' of the shaft 411' when the shaft 411' rotates. The first tail end 422' is connected to the elastic force module 6.

The variable force arm unit 5' includes a second rotating member 51' and a second wire 52'. The second rotating member 51' is linked with the first rotating member 41' and defines a variable second effective force arm. In detail, the second rotating member 51' has a gyro body 511', a spiral groove 512' and a second gear 513'. The gyro body 511' has a conical structure, can rotate along a central axis CX, and has a tip 5111', a bottom 5112' opposite to the tip 5111', a screw hole 5113' and a fixing end 5114'. The tip 5111' is pivotally connected to the other one of the pivoting members 27 adjacent to the sliding carrier 31, and the bottom 5112' has a diameter that is larger than a diameter of the tip 5111'. The screw hole 5113' is formed at the bottom 5112' and deviates from the central axis CX. The fixing end 5114' is formed at the bottom 5112' and extends outward along the central axis CX, and its cross-sectional shape is a flat shape (not limited to this, as long as it has other non-circular shape), and is pivotally connected to the other one of the pivoting members 27 away from the sliding carrier 31. Therefore, the gyro body 511' is completely contained between the frame members 26. The spiral groove 512' is formed on an outer surface of the gyro body 511', and has a groove body 5121', a groove head 5122' and a groove tail 5123'. The groove body 5121' is recessed on the outer surface of the gyro body 511' in a spiral manner. For example, when viewed from the bottom 5112' to the tip 5111', the groove body 5121' is spirally recessed from the bottom 5112' to the tip 5111' in a counterclockwise direction. The groove head 5122' is located at one end of the groove body 5121' and intercommunicates with the bottom 5112', so that a vertical distance from the groove head 5122' to the central axis CX is the largest. The groove tail 5123' is located at the other end of the groove body 5121' and at the tip 5111', so that a vertical distance from the groove tail 5123' to the central axis CX is the smallest. The vertical distance from each point in the groove body 5121' to the central axis CX gradually decreases from the groove head 5122' to the groove tail 5123', so the second effective force arm will change with different positions of the spiral groove 512'. For example, the second effective force arm adjacent to the groove head 5122' is longer than the second effective force arm adjacent to the groove tail 5123'. The second gear 513' is fixed to the fixing end 5114', and has a second central hole 5131'. The second central hole 5131' is for the fixing end 5114' to accommodate, and a cross-sectional shape of the second central hole 5131' is the same as the cross-sectional shape of the fixing end 5114', so the second gear 513' can move simultaneously with the gyro body 511'. In the embodiment, the central axis CX is parallel to the main axis MX and arranged up and down along the gravity direction G, and parallel to the first axis X1, so the gyro body 511' and the shaft 411' are stacked up and down. In addition, the second gear 513' and the first gear 412' are meshed with each other and have the same number of teeth, thereby causing the gyro body 511' and the shaft 411' to rotate synchronously but in reverse direction.

The second wire 52' is wound around the spiral groove 512', and has a second head end 521' and a second tail end 522' that are opposite to each other. In order to facilitate show and avoid concealing other elements, the second wire 52' is simplified into a single line in the drawings. The second head end 521' is fixed to the groove head 5122' and is fixed to the screw hole 5113' by, for example, a screw. The second tail end 522' is fixed to a screw of the fixing wire portion 311 of the sliding carrier 31, so the second wire 52' is wound in the direction of the spiral groove 512', for example, when viewed from the bottom 5112' to the tip 5111', the second wire 52' is wound from the groove head 5122' to the groove tail 5123' in a counterclockwise direction.

The elastic force module 6 includes an elastic member 61 and an adjustment unit 62. The elastic member 61 is a tension spring, which constantly provides an elastic force, and has a first end 611 and a second end 612 opposite to each other. The first end 611 is connected to the first tail end 422' of the first wire 42', and the second end 612 is connected to the adjustment unit 62. The adjustment unit 62 is used for changing a pre-stretching degree of the elastic member 61 and has an adjusting member 621 and a fixing member 622. The adjusting member 621 has a screw rod 6211 and a turntable 6212. The screw rod 6211 penetrates through the penetrating hole 241 and passes through the fixing block 24. The turntable 6212 is fixed to one end of the screw rod 6211, is adjacent to the base 1 and located below the fixing block 24. The turntable 6212 partially protrudes from the through slot 23 so as to be operated. The fixing member 622 has a body 6221, an internal threaded portion 6222, an external threaded portion 6223, and a straight portion 6224. The body 6221 is roughly cylindrical. The internal threaded portion 6222 penetrates through the body 6221 along the gravity direction G, and is provided for the screw rod 6211 to screw. The external threaded portion 6223 is formed on an outer peripheral surface of the body 6221 and screws the second end 612 of the elastic member 61. The straight portion 6224 is roughly in the shape of a plate, is formed on a bottom surface of the body 6221, and abuts against a back surface of the housing 21 of the upright column 2. When the turntable 6212 is rotated, the screw rod 6211 is linked to rotate relatively spirally in the internal threaded portion 6222, and the body 6221 cannot rotate synchronously but moves up and down relative to the screw rod 6211 due to the limit of the straight portion 6224, thereby adjusting the pre-stretching degree of the elastic member 61. For example, when the body 6221 moves upward relative to the screw rod 6211, the pre-stretching degree of the elastic member 61 is reduced. When the body 6221 moves downward relative to the screw rod 6211, the pre-stretching degree of the elastic member 61 increases, and an initial value of the elastic force will be larger.

Figure 10B:
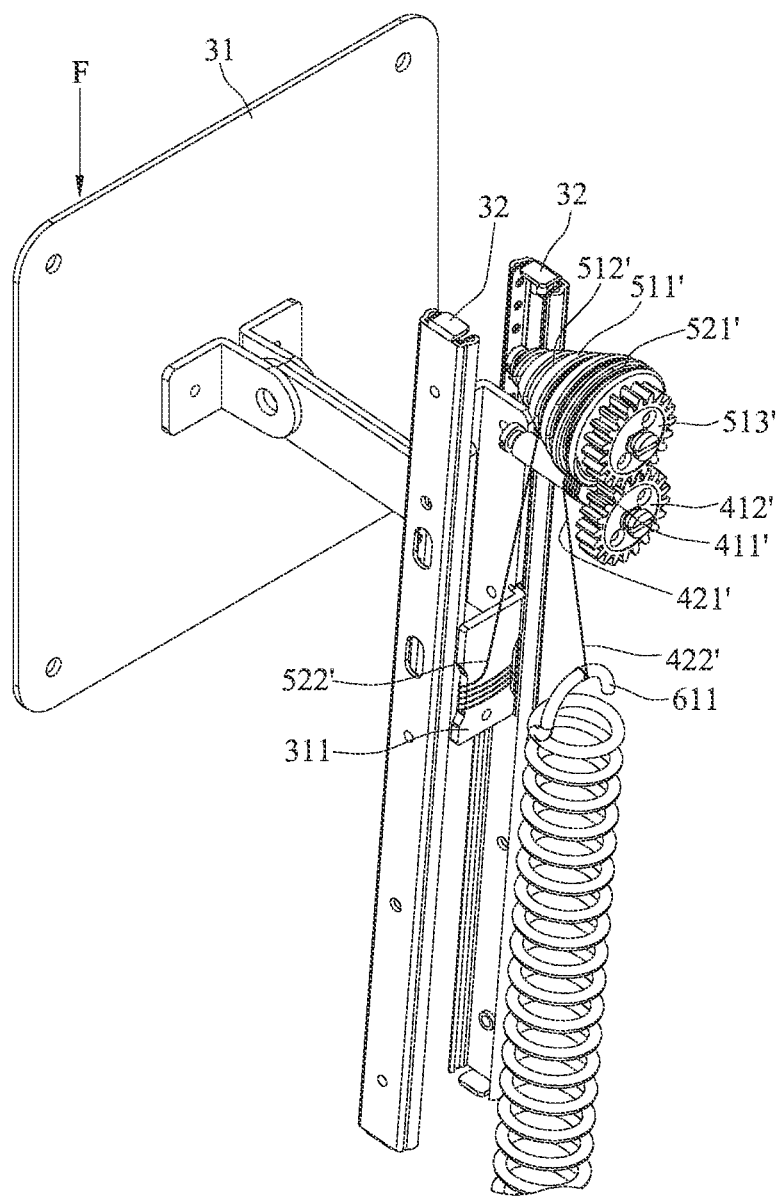

Please refer to FIG. 10A (for the convenience of description, FIG. 10A does not show related elements of the upright column 2), when the sliding carrier 31 is at the highest position, the first head end 421' of the first wire 42' is wound in a counterclockwise direction (viewed in the direction from the limiting section 4113' to the cylindrical section 4111') one turn on the shaft 411', and the second head end 521' of the second wire 52' is wound in the spiral groove 512'. When an external force F is applied to move the sliding carrier 31 from the highest position (FIG. 10A) to the lowest position (FIG. 10B), as shown in FIG. 10B (for convenience of explanation, FIG. 10B does not show the related elements of the upright column 2), the second wire 52' gradually separates from the spiral groove 512', thereby reducing the proportion of being wound in the spiral groove 512', and driving the gyro body 511' and the second gear 513' to rotate. Since the gyro body 511' and the shaft 411' are synchronously and reversely rotated through the linkage of the first gear 512' and the second gear 513', the proportion of the first wire 42' being wound on the shaft 411' in a counterclockwise direction (viewed in the direction from the limiting section 4113' to the cylindrical section 4111') gradually increases (for example, from being wound one turn to being wound five turns), thereby driving the elastic member 61 to stretch. At the lowest position, the elastic force provided by the elastic member 61 is the largest according to the maximum stretch by the first wire 42'. On the contrary, at the highest position, the elastic force provided by the elastic member 61 is the smallest according to the smallest degree of stretch by the first wire 42'. Therefore, when the sliding carrier 31 actuates from the highest position to the lowest position, the elastic force gradually becomes larger. Since the first effective force arm remains unchanged, a first torque will gradually become larger; and at the same time as the foregoing process, the second wire 52' starts to separate from the groove tail 5123', causing the proportion of being wound around the spiral groove 512' to gradually decrease, so that the second effective force arm gradually becomes longer, so a second torque also gradually becomes larger. Since the constant force arm unit 4' and the variable force arm unit 5' are linked, the first torque and the second torque become substantially synchronous and gradually increase. When the external force F is removed, the first torque of the first wire 42' generated by the elastic force and the second torque of the second wire 52' generated by the weight of the display 2000 can be balanced with each other, so that the sliding carrier 31 and the display 2000 can stop at an arbitrary position between the lowest position and the highest position.

Similarly, when an external force F is applied to make the sliding carrier 31 actuate from the lowest position to the highest position, for example, from FIG. 10B to FIG. 10A, at this time, the first wire 42' is pulled by the elastic force of the elastic member 61 and the gyro body 511' is driven to rotate via the first gear 512' and the second gear 513', so that the proportion of the first wire 42' being wound on the shaft 411' gradually decreases (for example, from being wound five turns to being wound one turn). Since the gyro body 511' and the shaft 411' are synchronously and reversely rotated through the linkage of the first gear 512' and the second gear 513', the second wire 52' is gradually wound back to the spiral groove 512' until the groove tail 5123', thereby increasing the proportion of winding in the spiral groove 512'. Because the degree of stretching is gradually reduced, the elastic force of the elastic member 61 gradually becomes smaller, and because the first effective force arm is unchanged, the first torque will gradually become smaller; and at the same time as the foregoing process, the second wire 52' is gradually wound back to the spiral groove 512', causing the proportion of winding around the spiral groove 512' to gradually increase, so that the second effective force arm gradually becomes shorter, so the second torque gradually becomes smaller. Since the constant force arm unit 4' and the variable force arm unit 5' are linked, the first torque and the second torque are gradually decreased substantially synchronously.

In the above embodiment, the spiral groove 512' is spirally recessed on the outer surface of the gyro body 511' in a counterclockwise direction (viewed in the direction from the bottom 5112' to the tip 5111'), the second wire 52' is also wound in a counterclockwise direction from the groove head 5122' to the groove tail 5123' (viewed in the direction from the bottom 5112' to the tip 5111'), and the first wire 42' is also wound in a counterclockwise direction to the shaft 411' (viewed in the direction from the limiting section 4113' to the cylindrical section 4111'), but the present disclosure is not limited to this. The spiral groove 512' can also be spirally recessed on the outer surface of the gyro body 511' in a clockwise direction (viewed in the direction from the bottom 5112' to the tip 5111'), the second wire 52' is also wound from the groove head 5122' in a clockwise direction to the groove tail 5123' (viewed in the direction from the bottom 5112' to the tip 5111'), and the first wire 42' is also wound in a clockwise direction to the shaft 411' (viewed in the direction from the limiting section 4113' to the cylindrical section 4111'). Regardless of whether it is clockwise or counterclockwise direction, because the gyro body 511' and the shaft 411' are synchronously and reversely rotated through the linkage of the first gear 512' and the second gear 513', the direction in which the second wire 52' is wound from the groove head 5122' to the groove tail 5123' is the same as the direction in which the first wire 42' is wound on the shaft 411'. In addition, a number of turns of the spiral groove 512' recessed on the outer surface of the gyro body 511' and a number of turns of the first wire 42' wound on the shaft 411' can also have different designs according to requirements, and the present disclosure is not limited thereto. In addition, the above-mentioned embodiment employs FIG. 10B as the lowest position (the sliding carrier 31 slides to the middle of each of the sliding rails 32), but it is not limited to this. In other embodiments, the lowest position referred to in the present disclosure can further slide the sliding carrier 31 to the bottom of each of the sliding rails 32, so that the proportion of the second wire 52' wound around the spiral groove 512' is reduced to only the groove head 5122', and the proportion of winding the first wire 42' on the shaft 411' is increased to more than five turns.

In addition, in the above embodiment, a number of teeth of the first gear 412' is the same as a number of teeth of the second gear 513' as an example for description, but the present disclosure is not limited to this. In other embodiments, the number of teeth of the first gear 412' may be different from the number of teeth of the second gear 513'. The purpose and function of the different number of teeth is: when the number of teeth of the first gear 412' is less than the number of teeth of the second gear 513', although the proportion of the second wire 52' wound in the spiral groove 512' is the same in the same or different embodiments, but the number of turns of the first wire 42' with different numbers of teeth will be greater than the number of turns with the same number of teeth. For example, the number of teeth of the first gear 412' is half of the number of teeth of the second gear 513', and the number of turns changed from five turns to ten turns. In other words, the increase in the number of winding turns is to compensate for the difference between the moving stroke of the sliding carrier 31 and the stretched stroke of the elastic member 61 caused by the different number of teeth. In addition, a case where the number of teeth of the first gear 412' is greater than the number of teeth of the second gear 513' is opposite, and will not be repeated here. Through the design of different numbers of teeth between the first gear 412' and the second gear 513', two advantages can be produced: first, the stretched length of the elastic member 61 can be shorter than the sliding stroke (sliding up and down) of the carrier 31 (and the display 2000), for example, when the carrier 31 slides by 30 cm, the elastic member 61 is only pulled by 15 cm, so as to prevent the elastic member 61 from being pulled close to the critical length, and the required reserved stretching space can be effectively reduced; second, different designs can be made with tension springs having different spring constants (k values), for example, under the same weight of the display, the number of teeth of the first gear 412' is greater than the number of teeth of the second gear 513', resulting in a low number of winding turns of the first wire 42', which can be used with a tension spring having a high k value (because the required stretch stroke is shorter), and the number of teeth of the first gear 412' is less than the number of teeth of the second gear 513', resulting in a high number of winding turns of the first wire 42', which can be used with a tension spring having a low k value (because the required stretch stroke is longer).

In addition, the first rotating member 41' and the second rotating member 51' become biaxially stacked up and down, which will reduce the width of the upright column 2, but increase the height of the upright column 2, but overall, the volume of the upright column 2 can still be smaller, and the manufacturing costs can be reduced.

In summary, the supporting device according to the present disclosure employs a design that the first wire is wound on the shaft with a constant diameter and the second wire is wound on the gyro body of non-equal diameter, so that the same tension direction of the tension spring and the direction of gravity of the display can be turned to achieve torque balance, whereby the display can be stopped at any position. In addition, the supporting device according to the present disclosure can reduce the space required for the gyro body and the shaft to be disposed in the upright column by adding a first gear and a second gear that mesh with each other, so that the overall volume of the supporting device can be reduced. Moreover, the supporting device according to the present disclosure further employs a design of the first gear and the second gear with different numbers of teeth to determine the number of turns of the first wire wound on the shaft and the k value of the tension spring used, so that it can be used more widely. For example, under a high-k tension spring and a low extension length, the life of the tension spring can be increased and the breakage caused by excessive extension can be prevented. Alternatively, a low-k tension spring can be used and the extension length can be controlled by the number of winding turns to achieve cost savings.

What is claimed is:

1. A supporting device for carrying a display on a work surface, the supporting device comprising:
    a base disposed on the work surface;
    an upright column disposed on the base, extending substantially along a gravity direction and including an opening;
    a lifting module disposed on the upright column and including:
        a sliding carrier sliding upward or downward between a lowest position and a highest position along the gravity direction, and partially extending outward along a first axis from the opening for the display to be arranged;
    a constant force arm unit including:
        a first rotating member self-rotatably disposed on the upright column and defining a constant first effective force arm; and
        a first wire being wound on the first rotating member and having a first head end and a first tail end opposite to each other, wherein the first head end is connected to the first rotating member, and wherein a proportion of the first wire wound around the first rotating member gradually decreases when the sliding carrier is moved from the lowest position to the highest position;

a variable force arm unit including:
- a second rotating member linked with the first rotating member and defining a variable second effective force arm; and
- a second wire being wound on the second rotating member and having a second head end and a second tail end opposite to each other, wherein the second head end is connected to the second rotating member, and the second tail end is connected to the sliding carrier, and wherein a proportion of the second wire wound around the second rotating member gradually increases when the sliding carrier is moved from the lowest position to the highest position; and an elastic force module including:
- an elastic member having a first end and a second end opposite to each other, wherein the first end is connected to the first tail end of the first wire, and the elastic member constantly provides an elastic force, wherein when the sliding carrier is at the lowest position, the elastic force is largest, and when the sliding carrier is at the highest position, the elastic force is smallest;

wherein the sliding carrier and the display are able to be actuated between the lowest position and the highest position when an external force is applied, and wherein when the external force is removed, a first torque generated in the first wire and a second torque generated in the second wire are balanced each other, such that the sliding carrier and the display are stopped at an arbitrary position between the lowest position and the highest position, wherein the elastic force module further includes an adjustment unit, and the second end of the elastic member is connected to the adjustment unit, and wherein a pre-stretching degree of the elastic member is able to be changed by operating the adjustment unit, wherein the adjustment unit has an adjusting member and a fixing member, the fixing member is disposed on the upright column, and the adjusting member is screwed on the fixing member and partially protrudes outside the upright column, wherein the adjusting member has a screw rod and a turntable fixedly connected to the screw rod, the fixing member has a body, an internal threaded portion, an external threaded portion and a straight portion, the internal threaded portion is screwed on the screw rod, the straight portion abuts against the upright column, the external threaded portion is screwed to the elastic member, and when the turntable is rotated, the body is moved relative to the screw rod by a limiting of the straight portion to adjust a stretching degree of the elastic member.

2. The supporting device of claim 1, wherein when the sliding carrier moves from the lowest position to the highest position, the elastic force gradually decreases, the proportion of the first wire wound around the first rotating member gradually decreases, and the first effective force arm remains unchanged, such that the first torque gradually decreases, and the proportion of the second wire wound around the second rotating member gradually increases, and the second effective force arm gradually becomes shorter, such that the second torque gradually decreases, and the first torque and the second torque gradually decrease substantially synchronously.

3. The supporting device of claim 2, wherein when the sliding carrier moves from the highest position to the lowest position, the elastic force gradually increases, the proportion of the first wire wound around the first rotating member gradually increases, and the first effective force arm remains unchanged, such that the first torque gradually increases, and the proportion of the second wire wound around the second rotating member gradually decreases, and the second effective force arm gradually becomes longer, such that the second torque gradually increases, and the first torque and the second torque gradually increase substantially synchronously.

4. The supporting device of claim 3, wherein the first rotating member has a shaft with a constant diameter, and the shaft rotates along a main axis, and wherein the second rotating member further has a gyro body and a spiral groove, the gyro body rotates along a central axis, the spiral groove is formed on an outer surface of the gyro body and is arranged to be wound by the second wire.

5. The supporting device of claim 4, wherein the spiral groove has a groove head and a groove tail, a distance from the groove head to the central axis is largest, a distance from the groove tail to the central axis is smallest, and the second head end of the second wire is fixed to the groove head.

6. The supporting device of claim 5, wherein the gyro body is fixedly connected to the shaft, and wherein the gyro body and the shaft synchronously rotate in a same direction.

7. The supporting device of claim 6, wherein the central axis coincides with the main axis and is substantially perpendicular to the first axis, and wherein the groove head is adjacent to the shaft.

8. The supporting device of claim 7, wherein a direction in which the first wire is wound around the shaft is opposite to a direction in which the second wire is wound around the spiral groove.

9. The supporting device of claim 4, wherein the first rotating member further has a first gear fixed to the shaft, the second rotating member further has a second gear fixed to the gyro body, and wherein the first gear and the second gear are meshed with each other, such that the gyro body and the shaft rotate synchronously but in opposite directions.

10. The supporting device of claim 9, wherein a direction in which the first wire is wound around the shaft is same as a direction in which the second wire is wound around the spiral groove.

11. The supporting device of claim 10, wherein the central axis is parallel to the main axis and parallel to the first axis, and wherein the gyro body and the shaft are stacked up and down.

12. The supporting device of claim 11, wherein a number of teeth of the first gear is different from a number of teeth of the second gear.

13. The supporting device of claim 1, wherein the upright column further includes a housing, the housing has a through slot, and the turntable partially protrudes from the through slot.

14. The supporting device of claim 13, wherein the lifting module further includes two sliding rails, the sliding rails are disposed on the upright column, and the sliding carrier is sandwiched between the sliding rails.

* * * * *